United States Patent
Durand

(10) Patent No.: US 7,926,528 B2
(45) Date of Patent: Apr. 19, 2011

(54) TRANSVERSE TREAD GROOVE PROFILE

(75) Inventor: Alain Durand, Aurieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 803 days.

(21) Appl. No.: 11/791,105

(22) PCT Filed: Nov. 22, 2005

(86) PCT No.: PCT/EP2005/056143
§ 371 (c)(1),
(2), (4) Date: May 18, 2007

(87) PCT Pub. No.: WO2006/056571
PCT Pub. Date: Jun. 1, 2006

(65) Prior Publication Data
US 2008/0121325 A1 May 29, 2008

(30) Foreign Application Priority Data
Nov. 24, 2004 (FR) ...................................... 04 12542

(51) Int. Cl.
*B60C 11/13* (2006.01)
(52) U.S. Cl. ................................... 152/209.18
(58) Field of Classification Search ............. 152/209.18, 152/209.21, 209.24, 209.26
See application file for complete search history.

(56) References Cited

U.S. PATENT DOCUMENTS

| | | | |
|---|---|---|---|
| 2,756,797 A | | 7/1956 | Campbell |
| 3,253,635 A | * | 5/1966 | Travers ......................... 152/523 |
| 3,254,693 A | * | 6/1966 | Travers ..................... 152/209.26 |
| 4,057,089 A | * | 11/1977 | Johannsen ............... 152/209.18 |
| 4,284,115 A | * | 8/1981 | Ohnishi .................... 152/209.24 |
| 4,611,647 A | * | 9/1986 | Rimondi ................... 152/209.12 |
| 5,176,766 A | * | 1/1993 | Landers et al. .......... 152/209.26 |
| 5,450,885 A | * | 9/1995 | Hanya ...................... 152/209.26 |
| 5,957,179 A | * | 9/1999 | Graas ....................... 152/209.26 |
| 7,392,832 B2 | * | 7/2008 | Roesgen et al. ......... 152/209.18 |
| 2002/0166615 A1 | * | 11/2002 | Gerresheim et al. ..... 152/209.18 |
| 2008/0105348 A1 | * | 5/2008 | Byrne et al. ............. 152/209.18 |

FOREIGN PATENT DOCUMENTS

| | | | |
|---|---|---|---|
| DE | 36 19 149 | | 12/1987 |
| DE | 102007026653 | * | 12/2008 |
| EP | 375596 | * | 6/1990 |
| GB | 2193933 | * | 2/1988 |
| JP | 04-201606 | * | 7/1992 |
| JP | 2001-121923 | | 5/2001 |
| KR | 2002-0003022 | * | 1/2002 |
| KR | 2004-0029608 | * | 4/2004 |

OTHER PUBLICATIONS

Machine translation for Korea 2004-0029608 (no date).*
Abstract for Korea 2004-0029608 (no date).*

* cited by examiner

*Primary Examiner* — Steven D Maki
(74) *Attorney, Agent, or Firm* — Buchanan Ingersoll & Rooney PC

(57) ABSTRACT

A tire tread comprising a plurality of grooves opening on to a running surface, each groove having an average orientation and being defined by facing walls, these walls being connected together by a groove bottom, each groove being defined geometrically by a transverse profile obtained by intersecting said groove by a section plane substantially transverse to the average direction of the groove, the transverse profile of a plurality of grooves having variable curvatures, the variation of said curvatures in the section plane being mathematically continuous. A tire provided with such a tread.

9 Claims, 1 Drawing Sheet

TRANSVERSE TREAD GROOVE PROFILE

The invention relates to tread patterns for tyre treads, and more particularly to tread patterns for tyres bearing heavy loads such as, for example, tyres for heavy vehicles or construction or handling vehicles, or for agricultural machinery.

It is usual to provide a tyre with a tread which in turn is provided with a tread pattern formed of a plurality of motifs in relief defined by grooves of transverse and/or longitudinal average orientation ("longitudinal direction" of a tread is understood here to mean the circumferential direction when this tread is fitted on a tyre).

A tyre for a vehicle bearing very heavy loads is subjected, inter alia, to compressive stresses in the region of contact between the tread of said tyre and the ground (or the roadway). These compressive stresses are locally amplified taking into account the presence of grooves. High localised stresses are noted at certain points on the walls defining said grooves. Possibly combined with forces exerted tangentially to the contact surface of the tyre with the ground, these localised stresses may lead to embrittlement of the walls of the grooves. The result may be in particular the appearance of cracks originating on said walls, these cracks then being propagated towards the inside of the tread.

This problem is known, and it has already been proposed to deal with it by adopting a particular transverse profile for the grooves of the tread. For example, U.S. Pat. No. 2,756,797 describes and proposes a tyre having grooves the transverse profile of which is formed of three interconnected parts. FIG. 1 shows a groove profile such as described in that patent. A groove 1 has a profile comprising a first, substantially rectilinear, part (AB) connecting a point A on the running surface to a point B located at two-thirds of the depth of the groove; a second part (BC) in the shape of an arc of a circle connects the first part to a third, planar, part (CD) forming the bottom of the groove. This third part is then extended by a part (DE) symmetrical to the part (BC), which itself is extended by a fifth and final part (EF) symmetrical to the first part (AB). The point F terminating this fifth part is located on the running surface. The connection between the first and second parts and the connection between the fourth and fifth parts are formed tangentially.

Although an improvement may have been noted for tyres produced in accordance with the teaching of this document, it is nowadays noted that this solution is not entirely satisfactory for certain categories of tyres developed for specific uses. This is the case in particular for tyres bearing very heavy loads (such as those fitted on construction machinery or those fitted on vehicles of heavy-vehicle or handling-vehicle type), for which the travelling conditions have greatly changed both as far as the loads borne and the travelling speeds are concerned.

The present invention relates to a solution which makes it possible to avoid the premature appearance, or even the appearance during use, of cracks on the walls of the grooves of a tread of a tyre for a vehicle which is under high stress in terms of loading and/or of travelling speed.

The tread according to the invention comprises a running surface intended to come into contact with the ground, a plurality of grooves opening on to the running surface, each groove having an average orientation and being defined by facing walls, these walls being connected together by a groove bottom, each groove being defined geometrically by a transverse profile obtained by intersecting said groove by a section plane substantially transverse to an average direction of the groove, this tread being characterised in that the transverse profile of a plurality of grooves has curvatures the variation of which in the section plane is mathematically continuous or, in other words; in that the variation in curvature at any point of said profile may be represented as a continuous mathematical function of the position (or curved abscissa) on said transverse profile.

"Average direction" of a groove is understood here to mean the average direction on the running surface of the groove obtained as the average of the directions of the traces on this running surface of the walls defining said groove. "Transverse direction" is understood to mean a direction different from the average direction of a groove and as a general rule this direction is taken perpendicular to this average direction.

It has been noted that a transverse groove profile of a curvature which is variable from one end point on the running surface to another end point on the same running surface, combined with a continuous variation of this curvature, made it possible to solve the problem mentioned further above. "Continuous variation" is understood to mean that between two points of a groove profile there is no discontinuity in the values adopted by said curvatures. Even under compressive stresses which are very much greater than those applied in use, it is possible to avoid the appearance of points of discontinuity on the transverse profile of a groove according to the invention, which distinguishes said invention from the known prior art.

In a first variant of the invention, the transverse profile of at least one groove may be represented by a mathematical function of the polynomial type of a degree greater than or equal to 2, or by a mathematical function of the parametric polynomial type.

In a second variant of the invention, the transverse profile of at least one groove may be represented by a mathematical function of the conical type ("conical" here is understood to mean a curve obtained by the intersection of a plane and a cone).

In a third variant of the invention, the transverse profile of at least one groove has a variation in curvature which is a linear function of the position of the point in question on said profile, to form a portion of a clothoid.

In a fourth variant, the transverse profile of at least one groove may be formed by a "stretched" portion of a clothoid. "Stretched" clothoid is understood here to mean a curve resulting from a clothoid to which an affinity is applied along one of its main axes.

In a fifth variant, the transverse profile of at least one groove may be represented by a mathematical function of the continuous spline curve type.

The invention also covers the profiles sufficiently approximating said profiles where the continuity of the curvatures can only, starting from a certain scale, be approximated for reasons linked in particular to the current possibilities of machining of moulds for moulding grooves.

In a sixth variant of the invention, the transverse profile of at least one groove has, between any two consecutive points on said profile, the same variation in curvature to form a portion of a spiral.

The invention also relates to a tyre provided with a tread such as defined previously.

Other characteristics and advantages of the invention will become apparent from the description given hereafter with reference to the appended drawings, which show, by way of non-limitative examples, forms of embodiment of the subject of the invention.

Figure 1:
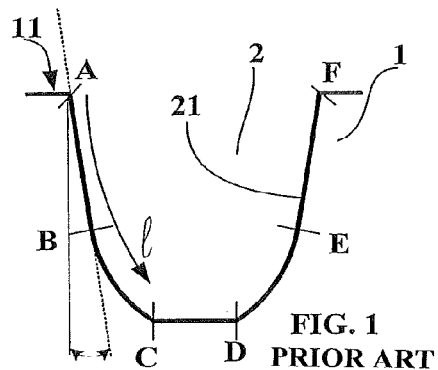
FIG. 1 shows a groove form according to the prior art.

FIG. 1 shows a form of a groove 2 of a tread 1 of the prior art in accordance with U.S. Pat. No. 2,756,797. According to this document, a groove 1 has a transverse profile 21 comprising a first, substantially rectilinear, part (AB) connecting a point A on the running surface 11 to a point B located at two-thirds of the depth of the groove; a second part (BC) in the shape of an arc of a circle connects the first part to a third, planar, part (CD) forming the bottom of the groove. This third part is then extended by a part (DE) symmetrical to the part (BC), which itself is extended by a fifth and final part (EF) symmetrical to the first part (AB). The point F terminating this fifth part is located on the running surface.

Figure 2:
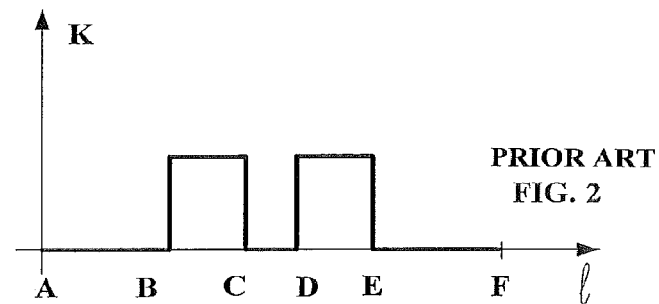
FIG. 2 shows the variations in curvature taken on the profile of the groove of FIG. 1.

Referring to FIG. 2, which shows at each point of the profile 21 the local value of the curvature in the section plane as a function of the curved abscissa 1 taken along the transverse groove profile between the points A and F, the intersections of said profile 21 with the running surface 11 (the origin of said abscissa being taken at the point A on the running surface), it will be noted that the curvatures are not continuous between the points of intersection of said profile with the running surface. In particular, at the point B there are two values of curvature: if one is on the straight-line segment AB, the curvature is zero, or if one is on the arc BC, the curvature is other than zero. This discontinuity of the curvatures, in accordance with what has been noted by the Applicants, would be the origin of the appearance of points sensitive to micro-cracking when the tread is under great stress.

If FIG. 2, which shows at each point the local value of the curvature (marked "K") as a function of the curved abscissa 1 taken along the transverse groove profile, is examined, it will be noted that the curvatures are either zero (on the rectilinear parts) or constant (on the parts of the arc of a circle) and that at the connection points (that is to say at B, C, D, E) there is a discontinuity of said curvatures although the tangents to said points are identical. It was observed that at these points of discontinuity concentrations of deformations and of stresses could occur, the probable cause of the appearance of micro-cracks.

Figure 3:
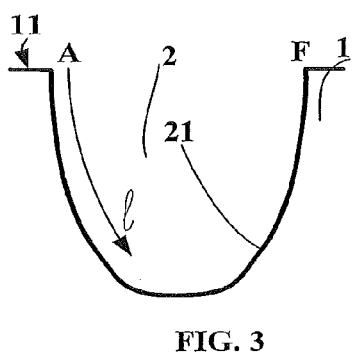
FIG. 3 shows a transverse profile of a groove according to the invention.

FIG. 3 shows a transverse profile of a groove 2 according to the invention. For convenience, the references of FIG. 1 are used to designate the same elements. This profile is represented diagrammatically here in a section plane substantially perpendicular to the longitudinal direction of the groove. According to the invention, the profile 21 when new of a groove 2 of a tread 1 extends between a point A and a point F, both on the running surface 11, and is described by a curve the mathematical expression of which, from the point of view of the curvatures, is as shown in FIG. 4.

Figure 4:
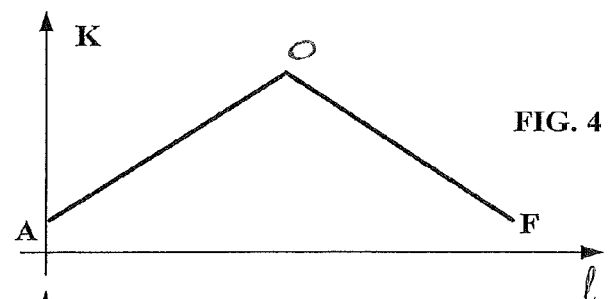
FIG. 4 shows the variations in curvature taken on the profile of the groove of FIG. 3.

In this FIG. 4, the x-axis ("1") represents the linear coordinates taken along the profile 21 of the groove 2, the origin of said coordinates being taken at the point A on the running surface. The geometric form representing the variation of the curvatures K at each of the points of the transverse profile comprises a first part of increasing linear variation between point A and a point O, followed continuously by a part of decreasing linear variation between the point O and the point F. The point O corresponds to that point of the profile located farthest to the inside of the tread.

The groove 2 of FIG. 3 has a transverse profile having a form corresponding to a portion of a mathematical curve referred to as a "clothoid". The coordinates of the points which constitute this portion cannot be determined algebraically; only the gradient and the curvature are readily calculable.

As a variant, not shown, it is also proposed to modify by a mathematical transformation of "affinity" type an initial geometric clothoid form in order to obtain a clothoid which is more or less "stretched" according to requirements. The final form thus obtained has the essential characteristic of the invention, namely that there is no discontinuity of the curvatures along the transverse profile of the groove.

Figure 5:
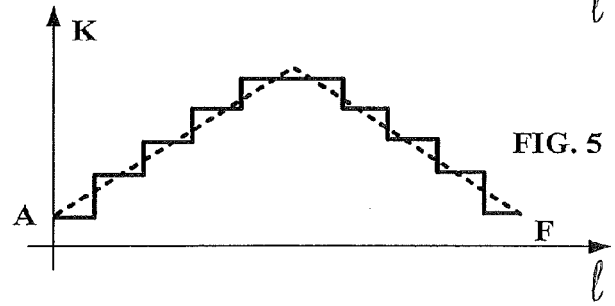
FIG. 5 shows the variations in curvature of a variant embodiment of a groove geometry close to that shown in FIG. 3.

In practice, it may nowadays be difficult to produce a groove profile the curvatures of which follow the form shown in FIG. 4; this is why it is considered that an embodiment such as shown in FIG. 5, while having slight discontinuities of the curvatures, is no less equivalent as far as the result obtained is concerned. In this FIG. 5, the desired curvatures K (in broken lines) are approximated by a series of successive curvatures separated from each other by slight discontinuities (in unbroken lines). "Slight discontinuities" is understood here to mean deviations in curvature less than those usually observed between a part of rectilinear profile (that is to say of zero curvature) and a curved part.

Figure 6:
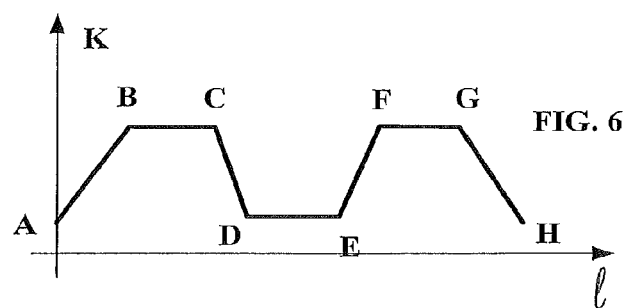
FIG. 6 shows a second curve of the variation of the curvatures of a groove variant according to the invention.

In another example, shown in FIG. 6, the variations in the curvature K follow an alternately increasing (parts AB and EF) and decreasing (parts CD and GH) linear form in alternation with parts of constant curvatures (parts BC, DE, FG). In this example, there is only a single value of curvature K at each point of the transverse profile (with the exception, however, of the points A and F which are also on the running surface).

The invention, which has been described above with reference to the examples given in non-limitative manner, is of course not limited solely to these examples; various modifications can be made thereto by the person skilled in the art.

The invention claimed is:

1. A tyre tread for heavy vehicles comprising a plurality of grooves opening on to a running surface, each groove having an average orientation and being defined by facing walls, these walls being connected together by a groove bottom, each groove being defined geometrically by a transverse profile when new obtained by intersecting said groove by a section plane substantially transverse to the average direction of the groove, wherein the transverse profile of a plurality of the grooves is represented by one mathematical function, this transverse profile having two end points located at the running surface, and having variable curvatures (K), the variation of said curvatures in the section plane being mathematically continuous in such a way that between the end points of the transverse profile there is no discontinuity in the curvature values of said curvatures, and the transverse profile is continuously concavely curved from one of the end points to the other end point.

2. A tread according to claim 1, characterized in that the transverse profile of at least one groove is represented by a mathematical function of the parametric polynomial type.

3. A tread according to claim 1, characterized in that the transverse profile of at least one groove is represented by a mathematical function of the continuous spline curve type.

4. A tread according to claim 1, characterized in that the transverse profile of at least one groove is represented by a mathematical function of the polynomial type of a degree greater than equal to 2.

5. A tread according to claim 1, characterised in that the transverse profile of at least one groove has, between any consecutive points taken on said profile, the same variation in curvature to form a portion of a spiral.

6. A tread according to claim 1, characterized in that the transverse profile of at least one groove has, between any two consecutive points taken on said profile, a continuous variation in curvature to form a conical portion.

7. A tread according to claim 1, characterized in that the transverse profile of at least one groove has a variation in curvature which is represented by a linear mathematical function of the position of the point in question on said profile, to form a portion of a clothoid.

8. A tread according to claim 1, characterised in that the transverse profile of at least one groove has a variation in curvature which in a linear function of the position of the point in question on said profile, to form a portion composed of a clothoid and an affinity.

9. A tyre provided with a tread according to claim 1.

* * * * *